(12) United States Patent
Koseki et al.

(10) Patent No.: US 12,009,158 B2
(45) Date of Patent: Jun. 11, 2024

(54) SOLID ELECTROLYTIC CAPACITOR AND METHOD FOR MANUFACTURING SAME

(71) Applicant: NIPPON CHEMI-CON CORPORATION, Tokyo (JP)

(72) Inventors: Kazuya Koseki, Tokyo (JP); Kazuhiro Nagahara, Tokyo (JP); Kazuma Okura, Tokyo (JP)

(73) Assignee: NIPPON CHEMI-CON CORPORATION, Tokyo (JP)

(*) Notice: Subject to any disclaimer, the term of this patent is extended or adjusted under 35 U.S.C. 154(b) by 78 days.

(21) Appl. No.: 17/786,082

(22) PCT Filed: Dec. 15, 2020

(86) PCT No.: PCT/JP2020/046801
§ 371 (c)(1),
(2) Date: Jun. 16, 2022

(87) PCT Pub. No.: WO2021/125183
PCT Pub. Date: Jun. 24, 2021

(65) Prior Publication Data
US 2023/0029692 A1    Feb. 2, 2023

(30) Foreign Application Priority Data

Dec. 17, 2019 (JP) ................. 2019-227609

(51) Int. Cl.
*H01G 9/15* (2006.01)
*H01G 9/00* (2006.01)
(Continued)

(52) U.S. Cl.
CPC ............. *H01G 9/15* (2013.01); *H01G 9/0029* (2013.01); *H01G 9/0425* (2013.01); *H01G 9/055* (2013.01)

(58) Field of Classification Search
None
See application file for complete search history.

(56) References Cited

U.S. PATENT DOCUMENTS 6,191,935 B1    2/2001  Okamura et al.
6,413,282 B1    7/2002  Tanahashi et al.
(Continued)

FOREIGN PATENT DOCUMENTS

CN    109950046 A    6/2019
JP    2000-114109 A    4/2000
(Continued)

OTHER PUBLICATIONS

Extened European Search Report dated Jul. 10, 2023 for Application No. 20902487.6.
(Continued)

*Primary Examiner* — Eric W Thomas
(74) *Attorney, Agent, or Firm* — Birch, Stewart, Kolasch & Birch, LLP

(57) ABSTRACT

Provided is a solid electrolytic capacitor having large capacitance, low ESR, and superior high-frequency characteristics and high-temperature endurance. The solid electrolytic capacitor is provided with: a cathode 10 having a cathode substrate 11 made of a valve metal and having an etching pit 11*a*; an oxide layer 12 made of an oxide of the valve metal provided on a surface of the cathode substrate 11, and a carbon coating layer 13 provided on a surface of the oxide layer 12, the carbon coating layer 13 including carbon particles and having an entry area 13*a* that enters the etching pit 11*a* and a penetration area 13*b* that penetrates through the oxide layer 12 and conducts with the cathode substrate 11; an anode having an anode substrate made of a valve metal, and a dielectric layer provided on a surface of the anode substrate and made of an oxide of the valve metal that composes the anode substrate; and a solid electrolyte (Continued)

layer including a conductive polymer provided between the carbon coating layer of the cathode and the dielectric layer of the anode.

12 Claims, 1 Drawing Sheet

(51) Int. Cl.
 *H01G 9/042* (2006.01)
 *H01G 9/055* (2006.01)

(56) References Cited

U.S. PATENT DOCUMENTS

| | | |
|---|---|---|
| 6,515,847 B1 | 2/2003 | Naraya |
| 6,808,845 B1 | 10/2004 | Nonaka et al. |
| 2002/0080558 A1 | 6/2002 | Nonaka et al. |
| 2011/0020603 A1* | 1/2011 | Kunishi ............ H01G 9/055 427/79 |
| 2011/0170229 A1 | 7/2011 | Imamura et al. |
| 2012/0237782 A1 | 9/2012 | Tsai |
| 2018/0047511 A1 | 2/2018 | Tsuda |
| 2018/0082798 A1 | 3/2018 | Tsuda |

FOREIGN PATENT DOCUMENTS

| | | | |
|---|---|---|---|
| JP | 2001-297952 A | 10/2001 | |
| JP | 2005-109272 A | 4/2005 | |
| JP | 2006-190878 A | 7/2006 | |
| JP | 2007-95865 A | 4/2007 | |
| JP | 2007-305686 A | 11/2007 | |
| JP | 2016-105497 A | 6/2016 | |
| WO | WO-2004077465 A1 * | 9/2004 | .......... H01G 9/0032 |
| WO | WO 2016/174806 A1 | 11/2016 | |

OTHER PUBLICATIONS

International Search Report (PCT/ISA/210) issued in PCT/JP2020/046801 dated Mar. 16, 2021.

Written Opinion (PCT/ISA/237) issued in PCT/JP2020/046801 dated Mar. 16, 2021.

* cited by examiner

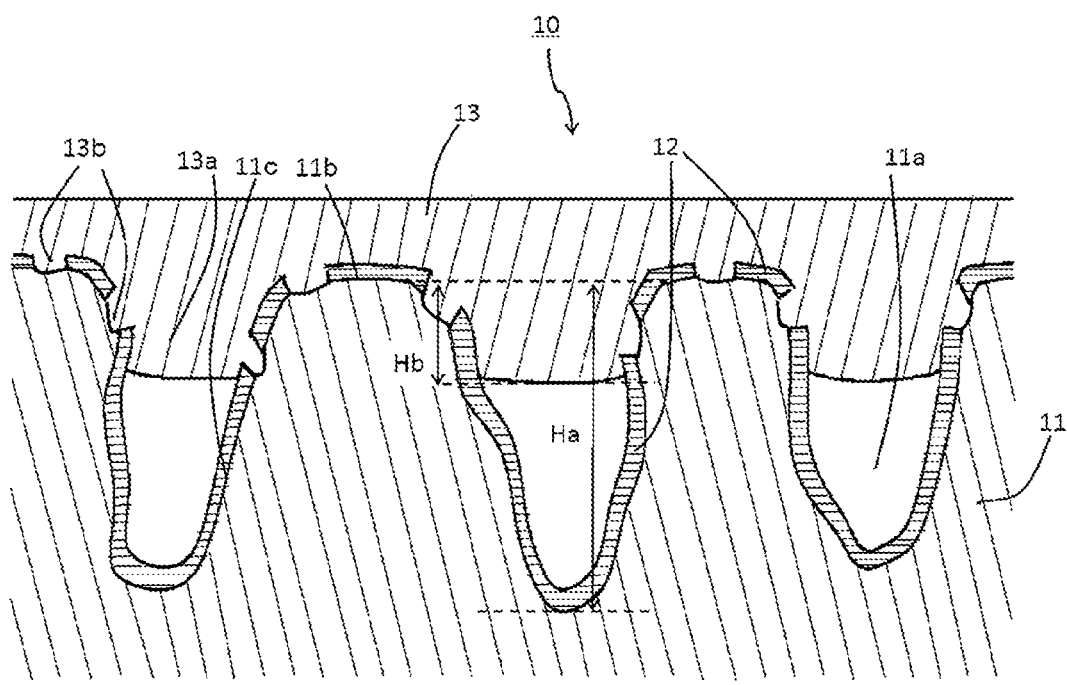

SOLID ELECTROLYTIC CAPACITOR AND METHOD FOR MANUFACTURING SAME

TECHNICAL FIELD

The present invention relates to a solid electrolytic capacitor with a solid electrolyte layer containing a conductive polymer and a method for manufacturing the same.

The Related Art

As electronic devices become smaller and faster, capacitors that are used in power supply circuits or the like are required to have high capacitance, low equivalent series resistance (hereinafter referred to as "ESR"), excellent high-frequency characteristics, and excellent high-temperature durability. Among electrolytic capacitors comprising: an anode having an oxide film as a dielectric on a surface of a substrate which is composed of a valve metal such as aluminum, tantalum, and niobium and has an enlarged surface; an electrolyte in contact with the oxide film that acts as a true cathode; and a cathode (apparent cathode) which is composed of a valve metal and is in contact with the electrolyte, a solid electrolytic capacitor using as the electrolyte a conductive polymer with high conductivity and a high thermal decomposition temperature which is derived from a monomer with a π-conjugated double bond such as a substituted or unsubstituted thiophene, pyrrole, and aniline (a solid electrolytic capacitor using a conductive polymer as an electrolyte is hereinafter simply referred to as a "solid electrolytic capacitor") is suitable for meeting the above-mentioned requirements.

A natural oxide film generally exists on the surface of the cathode composed of a valve metal in the solid electrolytic capacitor even without treatment to provide an oxide film. Therefore, the capacitance of the solid electrolytic capacitor (C) is the combined capacitance of an anode capacitance (Ca) and an cathode capacitance (Cc), as shown in the following formula, and even if the anode capacitance is increased by etching process, the capacitance of the capacitor will be smaller than the anode capacitance as long as the cathode has a capacitance.

$$C = \frac{1}{\frac{1}{Ca} + \frac{1}{Cc}}$$

Therefore, etching has also been applied to the valve metal foil of the cathode in order to increase the cathode capacitance in the solid electrolytic capacitors. However, there is a limit to increasing the cathode capacitance by etching and maintaining the cathode capacitance, because excessive etching simultaneously causes dissolution of the surface of the valve metal foil, which in turn hinders the increase in the surface enlargement ratio, and an oxide film is easily formed on the surface of the valve metal foil. Therefore, a method has been proposed to increase the cathode capacitance and suppress the growth of the oxide film by forming on the surface of the valve metal foil of the cathode a film of conductive material which is resistant to the formation of oxide film.

For example, Patent Document 1 (JP 2000-114109 A) discloses a solid electrolytic capacitor with a cathode foil in which a chemical oxide film is formed on the surface of an etched valve metal foil, and a film consisting of a metal nitride such as TiN, ZrN, and TaN that is difficult to form an oxide film on the surface is further formed on the chemical oxide film by vapor deposition. It is explained that the deposition of a metal nitride removes part of the chemical oxide film and makes the metal nitride and the valve metal foil conductive, so that the cathode capacitance becomes infinite and the capacitance of the capacitor (C) expressed in the above equation becomes maximized, that is, equal to the anode capacitance (Ca). And it has specifically been shown that the capacitor in an example using a cathode foil having a TiN film on a chemical oxide film has a higher capacitance and a lower dielectric loss than a capacitor using a cathode foil having a chemical oxide film only. Also, Patent Document 2 (JP 2005-109272 A) discloses a solid electrolytic capacitor with a cathode foil in which a chemical oxide film is formed on the surface of an etched valve metal foil, and a film consisting of a metal carbide with low specific electrical resistance such as TiC, WC, ZrC is formed on the chemical oxide film by vapor deposition, and it is explained that the low specific electrical resistance of the metal carbide allows the conductive polymer and the cathode foil to be in a conductive state, which maximizes the combined capacitance of the capacitor, and that ESR is reduced due to good adhesion between the metal carbide and the conductive polymer. And it has specifically been shown that the capacitor in an example using a cathode foil with a TiC film shown has higher capacitance and lower ESR than the capacitor in a comparative example using a cathode foil with a TiN film instead of the TiC film.

For the solid electrolytic capacitors disclosed in Patent Documents 1 and 2, a problem has been pointed out that an oxide film gradually grows on the surface of the metal nitride or metal carbide of the cathode, resulting in a decrease in capacitance of the capacitor. To solve this problem, a method of using a carbon film instead of a metal nitride or metal carbide film has been proposed. For example, Patent Document 3 (JP 2006-190878 A) discloses a solid electrolytic capacitor with a cathode in which a carbon film is formed on the surface of a valve metal using a dry plating method such as ion plating method, and explains that the carbon film is adhered to the surface of the valve metal and no oxide film is formed on the valve metal, so that the cathode capacitance approaches asymptotically to almost infinity and the capacitance of the capacitor is only the anode capacitance. It has also been shown that the use of a cathode foil with a carbon film formed by ion plating on an etched aluminum foil results in a higher capacitance at 120 Hz in a solid electrolytic capacitor than when an aluminum foil without a carbon film is used as the cathode foil. Technology to form carbon film by coating method has also been known. For example, in Patent Document 4 (JP 2007-095865 A) discloses a method for producing an aluminum cathode foil for an electrolytic capacitor in which a film of metal such as Ti is formed on the surface of a roughened aluminum material and carbon fine particles are fixed on the upper side of the metal film. In an example, the cathode foil is formed by forming a Ti film by vacuum evaporation or sputtering on an etched aluminum foil, then applying a coating material in which carbon fine particles are dispersed in an organic binder and heating it. As a comparative example, a cathode foil formed by applying the abovementioned coating material directly onto an etched aluminum foil and heating it is also shown. Almost identical capacitance is obtained in the example and the comparative example, except for the change of capacitances before and after a conversion treatment that assumes the application of a reverse voltage.

Prior Arts Documents

PATENT DOCUMENTS

Patent Document 1: JP 2000-114109 A
Patent Document 2: JP 2005-109272 A
Patent Document 3: JP 2006-190878 A
Patent Document 4: JP 2007-095865 A

SUMMARY OF THE INVENTION

Problems to be Solved by the Invention

Solid electrolytic capacitors have the advantages of being small and having high capacitance and low ESR, as well as being easy to be made into a chip, but their capacitance has generally been evaluated under a frequency of 120 Hz, and evaluation at high frequencies has not been sufficient. The inventors measured the capacitance at 10 kHz of prior art solid electrolytic capacitors with a cathode having a titanium carbide film, a carbon vapor-deposited film or a carbon coated film, and found that all capacitors showed relatively low capacitance and should be improved. The ESR of the abovementioned solid electrolytic capacitors was measured at frequencies of 10 kHz and 100 kHz, and all the capacitors exhibited relatively high ESR values. However, high capacitance, low ESR, excellent high-frequency characteristics, and excellent high-temperature durability are increasingly required for solid electrolytic capacitors as mentioned above.

Therefore, the objective of the present invention is to provide a solid electrolytic capacitor that can meet the abovementioned requests.

Means for Solving Problems

In PCT/JP2019/022741, which was unpublished at the time of filing of the application on which the priority claim of this application is based, the applicant discloses an electrode body having suitable capacitance used for a cathode of an electrolytic capacitor that has a cathode body composed of a valve metal and having an enlarged surface layer and a carbon layer formed on the enlarged surface layer, and is characterized in that the boundary between the enlarged surface layer and the carbon layer has an uneven shape, and further discloses a method of manufacturing the electrode body with suitable performance, in which a slurry containing carbon particles is applied to the surface of the cathode body, dried, and then subjected to a pressing process. When this method is performed by using an etched aluminum foil as a substrate, the pressing process can push the carbon particles into the etching pit in the aluminum foil and also make the carbon particles break through an oxide film on the aluminum foil to conduct between the carbon coating layer and the substrate aluminum.

PCT/JP2019/022741 details the performance of a wet electrolytic capacitor using the electrode body as a cathode, but it does not describe the capacitor performance when the electrode body is applied for a cathode of a solid electrolytic capacitor. The inventors prepared a solid electrolytic capacitor using the electrode body having suitable performance for a cathode and evaluated the performance of the resulting capacitor. The inventors have confirmed that not only the capacitance at 120 Hz but also the capacitance at 10 kHz increase, the ESR values at 10 kHz and 100 kHz are both significantly reduced, and furthermore that the capacitance and ESR of the capacitor show little change even after conducting a charge-discharge test under a high temperature condition of 105 degrees centigrade as an endurance test, and thus have completed the present invention.

Thus, the present invention relates to a solid electrolytic capacitor comprising:

a cathode comprising a cathode substrate composed of a valve metal and having an etching pit, an oxide layer composed of an oxide of the valve metal on a surface of the cathode substrate, and a carbon coating layer on a surface of the oxide layer having carbon particles and having an entry area entering the etching pit and a penetration area penetrating through the oxide layer and conducting with the cathode substrate, an anode comprising an anode substrate composed of a valve metal and a dielectric layer composed of an oxide of the valve metal that composes the anode substrate and provided on the surface of the anode substrate, and a solid electrolyte layer having a conductive polymer that is provided between the carbon coating layer of the cathode and the dielectric layer of the anode.

The present invention also relates to a method for manufacturing the solid electrolytic capacitor comprising:

a cathode formation process having a coating step of applying a carbon slurry having carbon particles to a surface of an oxide layer composed of an oxide of a valve metal on a surface of a cathode substrate composed of the valve metal and having an etching pit and drying the carbon slurry to form a slurry layer, and a pressing step of pressing the slurry layer to push the carbon particles into the etching pit and make the carbon particles penetrate through the oxide layer to form a carbon coating layer having an entry area entering the etching pit and a penetration area penetrating through the oxide layer and conducting with the cathode substrate;

an anode formation process of forming a dielectric layer by oxidizing a surface of an anode substrate composed of a valve metal; and an electrolyte formation process of forming a solid electrolyte layer having a conductive polymer between the carbon coating layer of the cathode and the dielectric layer of the anode.

The etching pit in the cathode substrate can be a tunnel pit or sponge-like pit, a through pit or residual core pit, and the oxide layer on the surface of the cathode substrate can be a chemical oxide film or a natural oxide film. In this specification, the portion of the cathode excluding the carbon coating layer may be represented as a "current collector".

When pressure is applied to the slurry layer in the pressing step of the cathode formation process, the carbon particles break through the oxide layer and conduct with the cathode substrate to form the penetration area of the carbon coating layer, and the carbon particles are pushed into the etching pit to form the entry area of the carbon coating layer. When an average length of the entry area in the carbon coating layer is one fifth or more, and preferably one fourth or more, of an average length of the etching pit, the adhesion between the carbon coating layer and the current collector in contact with this carbon coating layer is suitably maintained, the interface resistance between the carbon coating layer and the current collector is reduced, and the delamination of the carbon coating layer is suitably suppressed. The "length of the etching pit" is equal to the thickness of the cathode substrate when the cathode substrate has a through etching pit, or means the length from the opening position to the bottom of the etching pit when the cathode substrate has a residual core etching pit and is marked with the symbol Ha in the case shown in FIG. 1. The "length of the entry area in the carbon coating layer" means the length from the opening position of the etching pit to the position farthest from this opening position in the entry area and is marked with the symbol Hb in the case shown in FIG. 1. The average of these values can be obtained by referring to an SEM image of a cross-section of the cathode at 5,000× magnification and averaging the values obtained for each etching pit and entry area.

The pressure during the pressing step in the cathode formation process is preferably adjusted so that the interface resistance at the cathode is 10 mΩcm$^2$ or less, preferably 6 mΩcm$^2$ or less, and even more preferably 3 mΩcm$^2$ or less. By reducing the interface resistance to 10 mΩcm$^2$ or less during the pressing step, the conductivity between the carbon coating layer and the cathode substrate and the adhesion between the carbon coating layer and the current collector can be suitably secured. The "interface resistance at the cathode" means the interface resistance measured between the carbon coating layer and the cathode substrate that depends on all interfaces in the cathode, and can be obtained by a known measurement method, for example, by the following method. First, a cathode with a carbon coating layer having a thickness of 20 to 30 µm is formed. Next, a probe equipped with an array consisting of a plural test needles for measuring the potentials at many positions on the surface of the carbon coating layer and an array consisting of test needles for applying an electric current to the cathode that is provided around the array consisting of a plural test needles for measuring the potentials is brought into contact with the surface of the carbon coating layer, and the actual measurement of the potential distribution is obtained by applying a predetermined DC current between the test needles for applying an electric current and measuring the potentials generated on the surface of the carbon coating layer at many positions by the test needles for measuring the potentials during the application of the current. Next, a model equation is constructed using the measured current collector thickness, current collector resistance and carbon coating layer thickness as fixed values and using the carbon coating layer resistance and interface resistance as variables, and the potential distribution in the model equation is calculated while changing the variables. The interface resistance when the calculated value of the potential distribution obtained from the model equation agrees with the measured value of the potential distribution is the "interface resistance at the cathode". A suitable device for obtaining the interface resistance at the cathode is, for example, the electrode resistance measurement system RM2610 manufactured by Hioki E. E. CORPORATION. The thickness of the carbon coating layer is not limited as long as the entire surface of the oxide layer and cathode substrate which is to be coated by the carbon coating layer is coated by the carbon coating layer. For example, an average thickness of the carbon coating layer can be 0.5 to 30 µm. In the measurement method using the potential distribution described above, a carbon coating layer with a thickness of 20 to 30 µm is used. The values of interface resistance of a cathode obtained by pressing a thinner carbon coating layer at the same pressure are similar to those of a cathode with a carbon coating layer of 20 to 30 µm thickness.

The carbon coating layer of the solid electrolytic capacitor of the present invention has the entry area that enters the etching pit of the cathode substrate and therefore naturally contains at least carbon particles having a particle size that is capable of entering the etching pit. In a suitable embodiment of the present invention, the carbon coating layer also contains carbon particles having a particle size that cannot enter the etching pit, and thus the carbon slurry used in the coating step of the cathode formation process also contains carbon particles having a particle size that cannot enter the etching pit. Although only a portion of the particle having a particle size that cannot enter the etching pit may enter the etching pit, not the whole of the particle enters the etching pit. Thus, the particles having a particle size that cannot enter the etching pit are essentially present in the area except for the entry area of the carbon coating layer, and they play a role in compressing and deforming the etching pit during the pressing step of the cathode formation process to suitably improve the adhesion between the carbon coating layer and the current collector in contact with it, and to suitably lower the interface resistance between the carbon coating layer and the current collector. The particles with a particle size that is impossible to enter the etching pit also play a role of suitably pushing carbon particles with a particle size that can enter the etching pit into the etching pit during the pressing step of the cathode formation process. On the other hand, the carbon particles with a particle size that can enter the etching pit are present not only in the entry area of the carbon coating layer, but throughout the carbon coating layer by filling gaps between the larger carbon particles that are present only in the area excluding the entry area. The term "carbon particle" means a particle recognized as a single structural element in the carbon coating layer, which may be a primary particle, a secondary particle, or a higher order particle, and the term "particle size" means the particle size of a primary particle, a secondary particle, or a higher order particle, depending on the particle form described above.

As the carbon particles for the formation of a carbon coating layer, carbon particles having various shapes such as fibrous, spherical, scale shapes can be used without limitation, and examples include carbon nanotubes, carbon nanofibers, carbon nanohorns, porous carbon such as activated carbon, carbon black such as Ketjen black, furnace black, channel black and acetylene black, amorphous carbon, natural graphite, artificial graphite, graphitized Ketjen black and mesoporous carbon. If the carbon coating layer contains carbon particles having a particle size that cannot enter the etching pit, the carbon particles may be composed of the same type of carbon, in other words, the same type of carbon with a wide particle size distribution, for example, acetylene black with a wide particle size distribution, may be used to form the carbon coating layer. In this case, carbon particles of the same type having a particle size that makes them impossible to enter the etching pit play the role described above. Further, a mixtures of different types of carbon, for example, a mixture of scale graphite and acetylene black, may also be used to obtain a wide particle size distribution of carbon particles. When the carbon particles having a particle size that makes them impossible to enter the etching pit are composed of scale graphite, the etching pit is easily compressed and deformed because pieces of scale graphite are oriented so that their basal planes overlap each other, and the pieces of scale graphite easily penetrate through the oxide layer and conduct with the cathode substrate. Further, when scale graphite and carbon black are used together, carbon black is easily pushed into the etching pit and between the scale graphite, forming a particularly dense carbon coating layer with excellent conductivity and adhesiveness with the current collector, resulting in a solid electrolytic capacitor with particularly excellent high-frequency characteristics and high-temperature stability.

Advantageous Effects of the Invention

The solid electrolytic capacitor of the present invention exhibits high capacitance, low ESR, excellent high-frequency characteristics, and excellent high-temperature durability.

BRIEF DESCRIPTION OF THE DRAWINGS

FIG. 1 is a schematic FIGURE of a cathode cross-section, showing an area near a carbon coating layer in an enlarged scale.

DETAILED DESCRIPTION OF THE INVENTION

The solid electrolytic capacitor of the present invention comprises:
a cathode comprising a cathode substrate composed of a valve metal and having an etching pit, an oxide layer composed of an oxide of the valve metal on a surface of the cathode substrate, and a carbon coating layer on a surface of the oxide layer having carbon particles and having an entry area entering the etching pit and a penetration area penetrating through the oxide layer and conducting with the cathode substrate,
an anode comprising an anode substrate composed of a valve metal and a dielectric layer composed of an oxide of the valve metal that composes the anode substrate and provided on the surface of the anode substrate, and
a solid electrolyte layer having a conductive polymer that is provided between the carbon coating layer of the cathode and the dielectric layer of the anode. The special carbon coating layer described above gives high capacitance, low ESR, excellent high-frequency characteristics, and excellent high-temperature durability of the solid electrolytic capacitor. The solid electrolytic capacitor can be manufactured by a method comprising: a cathode formation process; an anode formation process; and an electrolyte formation process, as described below. Each process is described in detail below.

(1) Cathode formation process

The cathode formation process has: a coating step of applying a carbon slurry having carbon particles to a surface of an oxide layer composed of an oxide of a valve metal on a surface of a cathode substrate composed of the valve metal and having an etching pit and drying the carbon slurry to form a slurry layer; and a pressing step of pressing the slurry layer to push the carbon particles into the etching pit and make the carbon particles penetrate through the oxide layer to form a carbon coating layer having an entry area entering the etching pit and a penetration area penetrating through the oxide layer and conducting with the cathode substrate.

As the cathode substrate, a substrate composed of a valve metal and having an etching pit that has been used as a cathode substrate in conventional solid electrolytic capacitors can be used without any particular limitation. For example, a foil composed of a valve metal such as aluminum, tantalum, niobium, titanium, hafnium, zirconium, zinc, tungsten, bismuth and antimony with an increased surface area by chemical or electrochemical etching treatment can be used, and the aluminum foil is particularly preferred. The etching pit in the cathode substrate can be a tunnel pit or sponge-like pit, a through pit or residual core pit, and its form is selected according to the application usage of the solid electrolytic capacitor. The etching pit can be formed by using publicly known AC electrolytic methods and DC electrolytic methods.

The oxide layer formed on the surface of the cathode substrate can be a natural oxide film that generally exists on the surface of the cathode substrate, or additionally, a chemical oxide film can be formed on the surface of the cathode substrate by a chemical conversion treatment using a chemical conversion solution such as aqueous ammonium borate solution, aqueous ammonium adipate solution or aqueous ammonium phosphate solution, and the obtained chemical oxide film can be used as the oxide layer.

The carbon slurry used in the coating step contains at least carbon particles, a binder, and a dispersing medium.

As the carbon particles, carbon particles having various shapes such as fibrous, spherical, and scale shapes can be used without limitation. Examples include carbon nanotubes, carbon nanofibers, carbon nanohorns, porous carbon such as activated carbon, carbon black such as Ketjen black, furnace black, channel black and acetylene black, amorphous carbon, natural graphite, artificial graphite, graphitized Ketjen black, and mesoporous carbon. The carbon particles may be used alone or in a mixture of two types or more. However, the carbon slurry for forming the carbon coating layer with an entry area entering the etching pit naturally contains at least carbon particles having a particle size that is capable of entering the etching pit of the cathode substrate. In a suitable embodiment, the carbon slurry further contains carbon particles with a particle size that is impossible to enter the etching pit of the cathode substrate. In this suitable embodiment, the carbon particles may be composed of the same type of carbon. In other words, the same type of carbon with a wide particle size distribution, e.g., acetylene black with a wide particle size distribution can be used. Further, a mixture of different types of carbon, e.g., a mixture of scale graphite and of acetylene black can be used to obtain a wide particle size distribution of carbon particles.

As the binder, a known binder such as polytetrafluoroethylene, polyvinylidene fluoride, tetrafluoroethylene-hexafluoropropylene copolymer, polyvinyl fluoride, carboxymethyl cellulose, and styrene butadiene rubber can be used alone or two or more types can be mixed together. As the dispersing medium, a dispersing medium that does not adversely affect other components such as N-methylpyrrolidone, dimethylformamide, tetrahydrofuran, isopropyl alcohol, and water can be used without limitation.

A wet mixing method of the carbon particles, the binder, and the dispersing medium to obtain the carbon slurry is not limited, and wet mixing can be done by hand mixing using a mortar, or by using a known mixing device such as a stirrer or homogenizer. There is no special limitation on the mixing time as long as a uniform carbon slurry is obtained. The carbon particles and the binder are generally included in a mass ratio of 80:20 to 95:5.

The carbon slurry obtained is applied to the surface of the oxide layer that is formed on the surface of the cathode substrate under normal or reduced pressure using a known coating method such as a doctor blade method or a casting method and dried to form a slurry layer. Then, a pressing step is performed to apply pressure to the obtained slurry layer to form a carbon coating layer.

FIG. 1 shows a schematic FIGURE of a cross-section of the cathode 10 formed using the cathode substrate 11 with a residual core and sponge-like pit, in which the area around the carbon coating layer 13 is enlarged. The feature of the solid electrolytic capacitor of the present invention is that the carbon coating layer 13 in the cathode 10 has the entry area 13a entering the etching pit 11a and the penetration area 13b penetrating through the oxide layer 12 and conducting with the cathode substrate 11.

Before the carbon slurry is applied, a base layer composed of a conductive inorganic material such as carbon, titanium nitride, or titanium carbide can be provided on the surface of the oxide layer by a vapor deposition method such as vacuum deposition or ion plating. The base layer formed by the vapor deposition method is formed only on the surface of the oxide layer on the outer surface (surface without an etching pit; in FIG. 1, 11b is appended) of the cathode substrate and not on the surface of the oxide layer on the surface (in FIG. 1, 11c is appended) of the etching pit.

The pressing step can be performed by roll press or vertical press, but pressure must be applied to push the carbon particles into the etching pit of the cathode substrate and to make the carbon particles penetrate through the oxide layer. If the base layer is formed on the outer surface of the cathode substrate, pressure must be applied to make the carbon particles penetrate through the base layer and the oxide layer. Whether or not the carbon particles have penetrated through the oxide layer can be easily ascertained by a preliminary experiment investigating the correlation between the interfacial resistance at the cathode and the pressure. It is preferable to select a pressure such that the interface resistance is 10 m$\Omega$cm$^2$ or less, preferably 6 m$\Omega$cm$^2$ or less, and even more preferably 3 m$\Omega$cm$^2$ or less because it can suitably obtain conductivity between the carbon coating layer and the cathode substrate and adhesion between the carbon coating layer and the current collector. The pressure during pressing varies depending on the type of press equipment, cathode substrate, or the like used for pressing. However, when pressure is applied by a roll press, a linear pressure of 0.5 kNcm$^{-1}$ or higher is generally employed.

It is also preferable if the average value of the length of the entry area in the carbon coating layer (Hb in FIG. 1) is one fifth or more, preferably one fourth or more, of the average value of the length of the etching pit (Ha in FIG. 1), because the adhesion between the carbon coating layer and the current collector in contact with this carbon coating layer is suitably maintained, the interface resistance between the carbon coating layer and the current collector is reduced, and the delamination of the carbon coating layer is suitably suppressed.

If the carbon coating layer contains as the carbon particles the particles having a particle size that is impossible to enter the etching pit, the particles are effectively present in the area except for the entry area of the carbon coating layer, and play a role in compressing and deforming the etching pit during the pressing step to suitably improve the adhesion between the carbon coating layer and the current collector in contact with it and to suitably reduce the interface resistance between the carbon coating layer and the current collector. The particles with a particle size that is impossible to enter the etching pit also play a role of suitably pushing carbon particles having a particle size that can enter the etching pit into the etching pit. On the other hand, the carbon particles with a particle size that can enter the etch pit are present not only in the entry area of the carbon coating layer, but throughout the carbon coating layer by filling gaps between the larger carbon particles that are present only in the area excluding the entry area.

When the carbon particles having a particle size that cannot enter the etching pit are composed of scale graphite, the etching pit is easily compressed and deformed because pieces of scale graphite are oriented so that their basal planes overlap each other, and the pieces of scale graphite easily penetrates through the oxide layer and conduct with the cathode substrate. In addition, when scale graphite and carbon black are used concurrently, carbon black is easily pushed into the etching pit and between the scale graphite, forming a carbon conductive layer that is particularly dense, highly conductive, and has excellent adhesiveness with the current collector, and as a result, a solid electrolytic capacitor with particularly excellent high-frequency characteristics and high-temperature stability can be obtained. Scale graphite and carbon black are generally included in a mass ratio of 90:10 to 25:75.

(2) Anode formation process

In the anode formation process, a dielectric layer is formed by oxidizing the surface of an anode substrate composed of a valve metal. As the anode substrate, a substrate composed of a valve metal that has been used as an anode substrate in conventional solid electrolytic capacitors can be used without any particular limitations. For example, a foil composed of a valve metal such as aluminum, tantalum, niobium, titanium, hafnium, zirconium, zinc, tungsten, bismuth, and antimony, with its surface area increased by a chemical or electrochemical etching treatment, can be used, and the aluminum foil is particularly preferred. An etching pit in the anode substrate may be a tunnel pit or sponge-like pit, a through pit or residual core pit, and the form is selected according to the application of the solid electrolytic capacitor. The etching pit can be formed by a known AC or DC electrolytic method. The dielectric layer on the surface of the anode substrate can be formed by a known method of applying a chemical conversion treatment to the anode substrate by using a conversion solution such as aqueous ammonium borate solution, aqueous ammonium adipate solution or aqueous ammonium phosphate solution.

(3) Electrolyte formation process

In the electrolyte formation process, the carbon coating layer of the cathode and the dielectric layer of the anode are opposed to each other, and a solid electrolyte layer having a conductive polymer is formed between them. Generally, a separator is placed between the carbon coating layer of the cathode and the dielectric layer of the anode, and the solid electrolyte layer in contact with both the carbon coating layer of the cathode and the dielectric layer of the anode is held in this separator. For example, the solid electrolyte layer can be formed after a capacitor element is formed by stacking the cathode and the anode having a strip form so that the carbon coating layer of the cathode and the dielectric layer of the anode face each other via the separator and then winding the stack. Also, the solid electrolyte layer can be formed after the capacitor element is formed by stacking the cathode and the anode having a desired shape so that the carbon coating layer of the cathode and the dielectric layer of the anode face each other via the separator. Further, the solid electrolyte layer can be formed after a capacitor element is formed by alternately stacking multiple pairs of cathode and anode with a separator between them so that the carbon coating layer of the cathode and the dielectric layer of the anode face each other. As the separator, a woven or non-woven fabric composed of a cellulose-based fibers such as manila paper, kraft paper, esparto paper, hemp paper, cotton paper, rayon paper and their blends, a woven or non-woven fabric composed of polyester type resin such as polyethylene terephthalate, polybutylene terephthalate, polyethylene naphthalate and their derivatives, polytetrafluoroethylene type resin, polyvinylidene fluoride type resin, vinylon type resin, polyamide type resin, such as aliphatic polyamide, semi-aromatic polyamide and fully aromatic polyamide, polyimide type resin, polyethylene resin, polypropylene resin, trimethylpentene resin, polyphenylene sulfide resin, and acrylic resin, a glass paper, a glass paper mixed with manila paper or kraft paper, or the like can be used.

As a monomer to obtain the conductive polymer, a monomer having a 7l-conjugated double bond that is conventionally used for the production of a conductive polymer can be used without limitation. Representative monomers are exemplified below. The monomer may be used alone or as a mixture of two or more kinds of monomers.

First, thiophene and thiophene derivatives, including 3-alkylthiophenes such as 3-methylthiophene and 3-ethylthiophene, 3,4-dialkylthiophenes such as 3,4-dimethylthiophene and 3,4-diethylthiophene, 3-alkoxythiophenes such as 3-methoxythiophene and 3-ethoxythiophene, 3,4-dialkoxythiophenes such as 3,4-dimethoxythiophene and 3,4-diethoxythiophene, 3,4-alkylenedioxythiophenes such as 3,4-methylenedioxythiophene, 3,4-ethylenedioxythiophene and 3,4-(1,2-propylenedioxy)thiophene, 3,4-alkyleneoxythiathiophenes such as 3,4-methyleneoxythiathiophene, 3,4-ethyleneoxythiathiophene, and 3,4-(1,2-propyleneoxythia)thiophene, 3,4-alkylenedithiathiophene such as 3,4-methylenedithiathiophene, 3,4-ethylenedithiathiophene and 3,4-(1,2-propylenedithia)thiophene, and alkylthieno[3,4-b]thiophenes such as thieno[3,4-b]thiophene, isopropylthieno[3,4-b]thiophene and t-butyl-thieno[3,4-b]thiophene, are exemplified.

Also, pyrrole and pyrrole derivatives, including N-alkylpyrroles such as N-methylpyrrole and N-ethylpyrrole, 3-alkylpyrroles such as 3-methylpyrrole and 3-ethylpyrrole, 3-alkoxypyrroles such as 3-methoxypyrrole and 3-ethoxypyrrole, N-phenylpyrrole, N-naphthylpyrrole, 3,4-dialkylpyrroles such as 3,4-dimethylpyrrole and 3,4-diethylpyrrole, and 3,4-dialkoxypyrroles such as 3,4-dimethoxypyrrole and 3,4-diethoxypyrrole, are exemplified. Further, aniline and aniline derivatives, including 2,5-dialkylanilines such as 2,5-dimethylaniline and 2-methyl-5-ethylaniline, 2,5-dialkoxyanilines such as 2,5-dimethoxyaniline and 2-methoxy-5-ethoxyaniline, 2,3,5-trialkoxyanilines such as 2,3,5-trimethoxyaniline and 2,3,5-triethoxyaniline, and 2,3,5,6-tetraalkoxyanilines such as 2,3,5,6-tetramethoxyaniline and 2,3,5,6-tetraethoxyaniline, and furan and furan derivatives, including 3-alkylfurans such as 3-methylfuran and 3-ethylfuran, 3,4-dialkylfurans such as 3,4-dimethylfuran and 3,4-diethylfuran, 3-alkoxyfurans such as 3-methoxyfuran and 3-ethoxyfuran, and 3,4-dialkoxyfurans such as 3,4-dimethoxyfuran and 3,4-diethoxyfuran, can be exemplified.

As the monomer, a monomer selected from the group consisting of thiophenes having substituents at the 3-position and the 4-position is preferably used. The substituents at the 3 and 4 positions of the thiophene ring can form a ring with carbons at the 3 and 4 positions. In particular, 3,4-(ethylenedioxythiophene) is preferable because it provides a conductive polymer layer that exhibits high conductivity and excellent heat resistance.

The solid electrolyte layer can be formed by electrolytic polymerization, by chemical polymerization, or by using a dispersion liquid containing at least conductive polymer particles and a dispersing medium.

The electrolytic polymerization is performed by introducing the capacitor element into a polymerization solution containing at least a monomer, a supporting electrolyte and a solvent, and applying a voltage between the cathode and the anode. During the process of electrolytic polymerization, an anion released from the supporting electrolyte is included in the conductive polymer layer as a dopant. As the solvent for the polymerization solution for electrolytic polymerization, any solvent that can dissolve the desired amount of monomer and support electrolyte and does not adversely affect the electrolytic polymerization can be used without limitation. Examples include water, methanol, ethanol, isopropanol, butanol, ethylene glycol, acetonitrile, butyronitrile, acetone, methyl ethyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane and dimethylsulfolane. The solvent may be used alone or mixed with two or more types.

As the supporting electrolyte contained in the polymerization solution for electrolytic polymerization, any compound that releases a dopant contained in a conventional conductive polymer can be used without limitation. Examples include inorganic acids such as boric acid, nitric acid and phosphoric acid, organic acids such as acetic acid, oxalic acid and citric acid, as well as sulfonic acids such as methanesulfonic acid, dodecyl sulfonic acid and p-toluenesulfonic acid and their salts. Polycarboxylic acids such as polyacrylic acid, polymethacrylic acid and polymaleic acid, polysulfonic acids such as polystyrene sulfonic acid and polyvinyl sulfonic acid, and their salts can also be used as the supporting electrolyte. In addition, boron complexes such as borodisalicylic acid, borodioxalic acid, and borodimaronic acid, and sulfonyl imidic acids and their salts can also be used as the supporting electrolyte. Examples of the salts include alkali metal salts such as lithium salts, sodium salts and potassium salts, ammonium salts, and alkyl ammonium salts such as ethylammonium salts and butylammonium salts. The supporting electrolyte may be used alone or in a mixture of two or more types, and depending on the type of supporting electrolyte, it is used in an amount below saturation solubility in the polymerization solution and in a concentration that provides sufficient current for electrolytic polymerization.

The electrolytic polymerization is carried out by one of a potentiostatic method, a galvanostatic method, and a potential sweeping method. In the case of the potentiostatic method, a potential of 1.0 to 1.5V against the saturated calomel electrode is suitable, depending on the kind of monomer, in the case of the galvanostatic method, a current value of 1 to 10000 pA/cm$^2$ is suitable, depending on the kind of monomer, and in the case of the potential sweeping method, it is preferable to sweep the range of 0 to 1.5V against the saturated calomel electrode at a rate of 5 to 200 mV/sec, depending on the kind of monomer. The polymerization temperature is not strictly limited, but is generally in the range of 10 to 60 degrees centigrade. The polymerization time is not strictly limited, but generally range from 1 minute to 10 hours.

Formation of the solid electrolyte layer by the chemical polymerization can be done by preparing a solution in which both a monomer and an oxidizing agent are dissolved in a solvent, impregnating this solution between the carbon coating layer of the cathode and the dielectric layer of the anode and then drying, or by preparing a solution in which the monomer is dissolved in a solvent and a solution in which the oxidizing agent is dissolved in a solvent, alternately impregnating these solutions between the carbon coating layer of the cathode and the dielectric layer of the anode and then drying. The solvent can be, for example, water, methanol, ethanol, isopropanol, butanol, ethylene glycol, acetonitrile, butyronitrile, acetone, methyl ethyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane and dimethylsulfolane. The solvent may be used alone or in mixtures of two or more types.

As the oxidizing agent, for example, trivalent iron salts such as iron(III) p-toluenesulfonate, iron(III) naphthalene sulfonate and iron(III) anthraquinone sulfonate, or persulfates such as ammonium peroxodisulfate and sodium peroxodisulfate can be used, either as a single compound or in combination with two or more types. There is no strict limitation on the polymerization temperature, but it generally ranges from 10 to 60 degrees centigrade. There is also no strict limitation on the polymerization time, but it generally ranges from 1 minute to 10 hours.

Furthermore, the solid electrolyte layer can also be formed by impregnating a dispersion liquid containing at least conductive polymer particles and a dispersing medium between the carbon coating layer of the cathode and the dielectric layer of the anode and drying. The dispersing medium in the dispersion liquid include, for example, water, methanol, ethanol, isopropanol, butanol, ethylene glycol, acetonitrile, butyronitrile, acetone, methyl ethyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane and dimethylsulfolane, and water is preferred as the dispersing medium.

The dispersion liquid can be obtained, for example, by adding the monomer, the acid or its salt that releases a dopant and the oxidizing agent to water, stirring until chemical oxidation polymerization is completed, then removing the oxidizing agent and the residual monomer by a purification means such as ultrafiltration, cation exchange and anion exchange, and giving dispersion treatment such as ultrasonic dispersion treatment, high-speed fluid dispersion treatment and high-pressure dispersion treatment as necessary. The dispersion liquid can also be prepared by adding the monomer and the acid or its salt that releases a dopant to water, executing electrolytically oxidizing polymerization with stirring, followed by removing the residual monomer by a purification method such as ultrafiltration, cation exchange and anion exchange, and then, if necessary, by dispersion treatment such as ultrasonic dispersion treatment, high-speed fluid dispersion treatment, and high-pressure dispersion treatment. Furthermore, the dispersion liquid can be obtained by filtering the liquid obtained by the above-mentioned chemical oxidation polymerization or electrolytic polymerization method to separate agglomerates, thoroughly washing them, adding them to water, and applying dispersion treatment such as ultrasonic dispersion treatment, high-speed fluid dispersion treatment and high-pressure dispersion treatment. The content of conductive polymer particles in the dispersion liquid is generally in the range of 1.0 to 3.0 mass %, preferably in the range of 1.5 to 2.0 mass %. There is no strict limit on the drying temperature, but it is generally in the range of 50 to 200 degrees centigrade. There is also no strict limit on the drying time, but it generally ranges from 1 to 10 hours.

After the electrolyte formation process is completed, the capacitor element to which the solid electrolyte layer has been added is housed in an outer case and sealed to obtain the solid electrolytic capacitor of the present invention. As a method of encapsulating the capacitor element with the solid electrolyte layer formed, the method of molding the capacitor element with resin may be selected. In the solid electrolytic capacitor of the present invention, the carbon coating layer with the special form described above brings high capacitance, low ESR, excellent high-frequency characteristics, and excellent high-temperature durability.

In the solid electrolytic capacitor of the present invention, the solid electrolyte layer can be impregnated with an electrolytic solution to make a hybrid electrolytic capacitor. The electrolytic solution increases the capacitance of the capacitor and decreases ESR. The electrolytic solution also improves the performance of dielectric oxide film restoration and extends the life of the capacitor. For the hybrid electrolytic capacitor, an electrolytic solution suitable for low-voltage or medium-to-high-voltage applications can be used without limitation. Examples include electrolytic solutions in which an electrolyte such as ammonium salt, quaternary ammonium salt, quaternized amidinium salt or amine salt of borodisalicylic acid, borodioxalic acid, borodiglycolic acid, 1,6-decanedicarboxylic acid, azelaic acid, adipic acid, phosphoric acid or boric acid is dissolved at a given concentration in a solvent such as γ-butyrolactone, ethylene glycol, polyoxyethylene glycol, sulfolane, polycarbonate or mixtures thereof.

EXAMPLES

The present invention is described using the following examples, but the present invention is not limited to the following examples.

Example 1

An aluminum foil with a sponge-like etching pit formed at an etching ratio (ratio of actual surface area to projected area) of 22 was used as a cathode substrate to obtain a cathode. The aluminum foil was subjected to chemical conversion using an aqueous solution of ammonium dihydrogen phosphate as a chemical conversion solution, and a chemical oxide film (oxide layer) with a formation voltage of $1.2V_{fs}$ was formed on the surface of the aluminum foil.

As carbon particles, scale graphite with an average particle size of 4 μm and carbon black with an average primary particle size of 50 nm and an average secondary particle size of 0.3 μm were used. Carbon slurry is obtained by mixing a mixture of the scale graphite and the acetylene black at a mass ratio of 75:25, styrene butadiene rubber and an aqueous solution of sodium carboxymethylcellulose at a mass ratio of 84:10:6, and dispersing the mixture obtained with a stirrer.

The resulting carbon slurry was applied over the chemical oxide film and dried to form a slurry layer. This slurry layer was pressed by a roll press with a linear pressure of 5.38 $kNcm^{-1}$ to form a 1 μm thick carbon coating layer, and then punched out to a projected area of 2.1 $cm^2$ to obtain a cathode for a solid electrolytic capacitor. The cross section of the cathode was observed by an SEM image, and it was found that the carbon black had entered until about one third of the length of the etching pit. In the area excluding the entry section of the carbon coating layer, pieces of the scale graphite were oriented so that their basal surfaces overlapped each other, and the carbon black was filled between these graphite pieces. Furthermore, a cathode with a carbon coating layer of 20 μm thickness was prepared for the purpose of confirmation by applying and drying the carbon slurry on the carbon coating layer of the cathode for a solid electrolytic capacitor, and the interface resistance was measured at this cathode using an electrode resistance measurement system (model number RM2610, manufactured by HIOKI E. E. CORPORATION). The interface resistance was 1.6 3 mΩcm², and this value indicated that the carbon coating layer of the cathode for a solid electrolytic capacitor was conductive to the aluminum of the cathode substrate.

An aluminum foil with a sponge-like etching pit was used as an anode substrate to obtain an anode. This aluminum foil was subjected to chemical conversion treatment using aqueous ammonium adipate solution to form a chemical oxide film (a dielectric layer) with a formation voltage of $45.6V_{fs}$ on the surface of the aluminum foil. The aluminum foil to which the dielectric layer was added was then punched out to a projected area of 2.1 cm² and the end face portion formed during punching was repaired by chemical conversion treatment using an aqueous solution of ammonium dihydrogen phosphate as a chemical conversion solution for 10 minutes at a current density of 0.2 mAcm$^{-2}$ to obtain an anode for a solid chemical capacitor.

The resulting anode and cathode were each ultrasonically connected to an aluminum terminal, and the dielectric layer of the anode and the carbon coating layer of the cathode were placed opposite each other through a zigzag-folded separator and fixed with an imide tape to obtain a capacitor element.

Fine particles of poly(3,4-ethylenedioxythiophene) and polystyrenesulfonic acid were dispersed in a dispersing medium in which 5% ethylene glycol was added to water in order to obtain a dispersion liquid to form a solid electrolyte layer. The abovementioned capacitor element was impregnated with the obtained dispersion liquid under 30 kPa pressure for 120 seconds and dried at 110 degrees centigrade for 120 minutes. Then, the capacitor element to which the solid electrolyte layer was added was sealed with a laminate material to obtain a solid electrolytic capacitor with a rated voltage of 25 WV.

The obtained solid electrolytic capacitor was aged for 60 minutes at 105 degrees centigrade by applying a voltage of 28.8V, and as the initial characteristics of the capacitor, the capacitance was measured at 120 Hz and 10 kHz and ESR was measured at 10 kHz and 100 kHz, both under the condition of 20 degrees centigrade. The capacitor was then subjected to an endurance test of 500 cycles of charge-discharge at 105 degrees centigrade, and as the characteristics of the capacitor after the endurance test, the capacitance was measured at 120 Hz and 10 kHz and ESR was measured at 10 kHz and 100 kHz again, both under the condition of 20 degrees centigrade. The charging and discharging were performed between 25V and 0V, charging for 10 seconds at a charging current of 20 mA and discharging for 10 seconds with a discharge resistance of 0Ω (no resistance).

Comparative Example 1

The procedure of Example 1 was repeated, except that no pressure treatment was applied to the slurry layer during the cathode formation process. The thickness of the carbon coating layer in the cathode for a solid electrolytic capacitor was 1 μm. The cathode cross section was observed by SEM image, and few carbon particles were found in the etching pit. Furthermore, the value of the interface resistance of the cathode for the purpose of confirmation with a carbon coating layer of 20 μm thickness obtained by applying and drying the abovementioned carbon slurry on the carbon coating layer of the cathode for a solid electrolytic capacitor was 31.2 mΩcm², and it was found that the carbon coating layer of the cathode for a solid electrolytic capacitor was not conducting with the aluminum in the cathode substrate.

Example 2

The procedure of Example 1 was repeated, except that a carbon slurry for forming a carbon coating layer in a cathode was prepared by using only carbon black with an average primary particle size of 35 nm and an average secondary particle size of 0.3 μm as carbon particles. The thickness of the carbon coating layer in the cathode for a solid electrolytic capacitor was 1p m. The cathode cross section was observed by an SEM image, and it was found that the carbon black had entered until about one third of the length of the etching pit. Furthermore, the value of the interface resistance of the cathode for the purpose of confirmation with a carbon coating layer of 20 μm thickness obtained by applying and drying the abovementioned carbon slurry on the carbon coating layer of the cathode for a solid electrolytic capacitor was 1.83 mΩcm², and it was found that the carbon coating layer of the cathode for a solid electrolytic capacitor was conducting with the aluminum in the cathode substrate.

Comparative Example 2

The procedure of Example 2 was repeated, except that no pressure treatment was applied to the slurry layer during the cathode formation process. The thickness of the carbon coating layer in the cathode for a solid electrolytic capacitor was 1 μm. The cathode cross section was observed by an SEM image, and entry of carbon particles near the etching pit opening was found in the etching pit. Furthermore, the value of the interface resistance of the cathode for the purpose of confirmation with a carbon coating layer of 20 μm thickness obtained by applying and drying the abovementioned carbon slurry on the carbon coating layer of the cathode for a solid electrolytic capacitor was 19.7 mΩcm², and it was found that the carbon coating layer of the cathode for a solid electrolytic capacitor was not conducting with the aluminum in the cathode substrate.

Comparative Example 3

An aluminum foil with a sponge-like etching pit formed at an etching ratio of 70 was used as a cathode substrate to obtain a cathode. This aluminum foil was subjected to chemical conversion treatment using an aqueous solution of ammonium dihydrogen phosphate as a chemical conversion solution to form a chemical oxide film (oxide layer) with a formation voltage of $3V_{fs}$ on the surface of the aluminum foil, and then was punched out to a projected area of 2.1 cm² to obtain the cathode for a solid electrolytic capacitor. In this comparative example, no coating layer was formed on the chemical oxide film. A solid electrolytic capacitor was prepared using the abovementioned cathode as well as the anode and dispersion liquid used in Example 1, and the obtained solid electrolytic capacitor was subjected to characteristic evaluation under the same conditions as those shown in Example 1.

Comparative Example 4

An aluminum foil with a sponge-like etching pit formed at an etching ratio of 7 or less was used as a cathode substrate to obtain a cathode. This aluminum foil was subjected to chemical conversion treatment using aqueous solution of ammonium dihydrogen phosphate as a chemical conversion solution to form a chemical oxide film (oxide layer) with a formation voltage of $5V_{fs}$ on the surface of the aluminum foil. Next, instead of a carbon coating layer, a vapor-deposited film consisting of titanium carbide was formed on the surface of the chemical oxide film by arc ion plating, and then punched out to a projected area of 2.1 cm$^2$ to obtain the cathode for a solid electrolytic capacitor. The titanium carbide vapor-deposited film did not enter the etching pit. A solid electrolytic capacitor was prepared using the abovementioned cathode as well as the anode and dispersion liquid used in Example 1, and the resulting solid electrolytic capacitor was subjected to characteristic evaluation under the same conditions as those shown in Example 1.

Comparative Example 5

An aluminum foil without an etching pit was used as a cathode substrate to obtain a cathode. In this comparative example, no chemical oxide film was formed, and a natural oxide film was used as the oxide layer. Next, instead of a carbon coating layer, a vapor-deposited film consisting of carbon was formed on the surface of the natural oxide film by sputtering, and then punched out to a projected area of 2.1 cm$^2$ to obtain the cathode for a solid electrolytic capacitor. A solid electrolytic capacitor was prepared using this cathode as well as the anode and dispersion liquid used in Example 1, and the resulting solid electrolytic capacitor was subjected to characteristic evaluation under the same conditions as those shown in Example 1.

Table 1 shows the capacitance values at 20 degrees centigrade obtained for the solid electrolytic capacitors of Examples 1 to 2 and Comparative Examples 1 to 5, and Table 2 shows the ESR values at 20 degrees centigrade obtained for the solid electrolytic capacitors of Examples 1 to 2 and Comparative Examples 1 to 5. In the tables, carbon black is represented by CB.

TABLE 1

|  | Coating layer | Pressing | Capacitance/120 Hz | | | Capacitance/10 kHz | | |
|---|---|---|---|---|---|---|---|---|
|  |  |  | initial (µF) | post-test (µF) | rate of change (%) | initial (pF) | post-test (µF) | rate of change (%) |
| Example 1 | carbon (graphite: CB = 75:25) | Yes | 38.0 | 38.1 | +0.3 | 30.8 | 30.9 | +0.3 |
| Comparative Example 1 | carbon (graphite: CB = 75:25) | No | 34.1 | 34.2 | +0.3 | 19.7 | 19.8 | +0.5 |
| Example 2 | carbon (graphite: CB = 0:100) | Yes | 39.7 | 39.9 | +0.5 | 23.1 | 23.8 | +3.0 |
| Comparative Example 2 | carbon (graphite: CB = 0:100) | No | 34.2 | 34.3 | +0.3 | 19.9 | 18.9 | −5.0 |
| Comparative Example 3 | N/A | — | 25.8 | 27.1 | +5.0 | 20.1 | 15.6 | −22.4 |
| Comparative Example 4 | titanium carbide vapor deposition | — | 35.2 | 35.6 | +1.1 | 14.8 | 13.9 | −6.1 |
| Comparative Example 5 | carbon vapor deposition | — | 30.7 | 30.7 | 0 | 19.6 | 19.2 | −2.0 |

TABLE 2

|  | Coating layer | Pressing | ESR/10 kHz | | | ESR/100 kHz | | |
|---|---|---|---|---|---|---|---|---|
|  |  |  | initial (mΩ) | post-test (mΩ) | rate of change (%) | initial (mΩ) | post-test (mΩ) | rate of change (%) |
| Example 1 | carbon (graphite:CB = 75:25) | Yes | 123 | 121 | −1.6 | 66 | 65 | −1.5 |
| Comparative Example 1 | carbon (graphite CB = 75:25) | No | 432 | 441 | +2.1 | 121 | 125 | +3.3 |
| Example 2 | carbon (graphite:CB = 0:100) | Yes | 245 | 241 | −1.6 | 77 | 76 | −1.3 |
| Comparative Example 2 | carbon (graphite:CB = 0:100) | No | 471 | 507 | +8.6 | 139 | 141 | +1.4 |
| Comparative Example 3 | N/A |  | 227 | 397 | +74.9 | 90 | 104 | +15.6 |
| Comparative Example 4 | titanium carbide vapor deposition |  | 1118 | 1232 | +10.2 | 357 | 360 | +0.8 |
| Comparative Example 5 | carbon vapor deposition |  | 540 | 550 | +1.9 | 236 | 228 | −3.4 |

The titanium carbide vapor-deposited film in the cathode of the capacitor in Comparative Example 4, the carbon vapor-deposited film in the cathode of the capacitor in Comparative Example 5, and the carbon coating layer in the cathode of the capacitors in Comparative Examples 1 and 2 which is formed via the application of carbon slurry but is not pressed, are conventionally known as the coating layer that increases the capacitance of the capacitor by bringing the cathode capacitance close to infinity and suppresses the growth of aluminum oxide film in the cathode (see Patent Documents 2 to 4). When the capacitance and ESR of the capacitors in Comparative Examples 1 and 2 are compared with those of the capacitor in Comparative Example 3 which has a cathode without a coating layer, the capacitance and ESR changes before and after the charge-discharge test are indeed small and the capacitance at 120 Hz is higher, but the capacitance at 10 kHz was rather lower, indicating a problem with high-frequency characteristics. The capacitors in Comparative Examples 1 and 2 showed even lower ESR than the capacitors in Comparative Examples 4 and 5, but the capacitance at 10 kHz was still low and had a problem with high-frequency characteristics.

In contrast, in the capacitors of Examples 1 and 2, which are equipped with a cathode having a carbon coating layer formed via the application of a carbon slurry and pressed, the ESR values are remarkably lower at 10 kHz and 100 kHz, and the changes in ESR before and after the charge-discharge test were almost the same in an excellent manner, as can be clearly seen by comparing the ESR value in the capacitor in Example 1 with that in the corresponding capacitor in Comparative Example 1 and the ESR value in the capacitor in Example 2 with that in the corresponding capacitor in Comparative Example 2. The remarkable decrease in ESR in the capacitors of Examples 1 and 2 can be attributed to the improved adhesion between the carbon coating layer and the current collector in contact with it, resulting in the decrease in the interface resistance between them. Also, as can be clearly ascertained by comparing the capacitance in the capacitor of Example 1 with that in the corresponding capacitor of Comparative Example 1 and the capacitance in the capacitor of Example 2 with that in the corresponding capacitor of Comparative Example 2, the capacitance of the capacitors in Examples 1 and 2 increased both at 120 Hz and at 10 kHz, and the capacitance change at 10 kHz before and after the charge-discharge test was also improved, indicating improved high-frequency characteristics.

It has already been shown in Patent Documents 1 to 4 that a coating layer can increase the capacitance of a capacitor by bringing the cathode capacitance close to infinity, but, measurements have so far been made exclusively at 120 Hz, and capacitance in the high-frequency region (10 kHz) has not been shown. As can be seen from the capacitance of the capacitors in Comparative Examples 1 to 5, the measures in these prior art documents do not increase the capacitance in the high-frequency region (10 kHz).

The capacitance in the high-frequency region (10 kHz) is considered to be determined by the magnitude relationship between the interface resistance in the component consisting of a cathode and a solid electrolyte layer (the interfacial resistance measured between a solid electrolyte layer and a cathode substrate, which depends on all interfaces included in the component), and the resistance of the oxide film (oxide layer) in the current collector. In the capacitors in Comparative Examples 1 and 2, where pressing treatment to form the carbon coating layer is not performed, the interface resistance between the current collector and the carbon coating layer is large, so the former is larger than the latter, and as a result, the effect of the cathode capacitance generated by the oxide film in the current collector results in low capacitance of the capacitor. In the capacitors in Examples 1 and 2, where pressing treatment is performed to form the carbon coating layer, the former becomes smaller than the latter because the interface resistance between the current collector and the carbon coating layer is smaller. As a result, the effect of the cathode capacitance by the oxide film in the current collector is not shown, and the capacitance of the capacitor is considered to be higher.

Comparing the characteristics of the capacitor in Example 1 with those of the capacitor in Example 2, the ESR of the capacitor in Example 1 is particularly low, the capacitance of the capacitor in Example 1 at 10 kHz is particularly high, and the capacitance change before and after the charge-discharge test is particularly small, which shows that the capacitor in Example 1 has particularly excellent high-frequency characteristics and high-temperature stability. This is considered to be due to the fact that the scale graphite pieces, which exist effectively only in the area except for the entry section of the carbon coating layer, are oriented so that their basal surfaces overlap each other, easily compress and deform the etching pit, and easily penetrate through the oxide layer to conduct with the cathode substrate, and also the carbon black is easily pushed into the etching pit and between the scale graphite pieces, forming a carbon coating layer that is dense, highly conductive, and adheres well to the current collector.

INDUSTRIAL APPLICABILITY

The present invention provides solid electrolytic capacitors with high capacitance, low ESR, excellent high-frequency characteristics, and excellent high-temperature durability.

Explanation of References 10 cathode
11 cathode substrate
11*a* etching pit
11*b* outer surface
11*c* surface of etching pit
12 oxide layer
13 carbon coating layer
13*a* entry area
13*b* penetration area
Ha length of etching pit
Hb length of entry area

What is claimed is:
1. A solid electrolytic capacitor comprising:
a cathode comprising a cathode substrate composed of a valve metal and having an etching pit, an oxide layer composed of an oxide of the valve metal on a surface of the cathode substrate, and a carbon coating layer on a surface of the oxide layer having carbon particles and having an entry area entering the etching pit and a penetration area penetrating through the oxide layer and conducting with the cathode substrate,
an anode comprising an anode substrate composed of a valve metal and a dielectric layer composed of an oxide of the valve metal that composes the anode substrate and provided on the surface of the anode substrate, and
a solid electrolyte layer having a conductive polymer that is provided between the carbon coating layer of the cathode and the dielectric layer of the anode, wherein an average length of the entry area of the carbon coating layer is one fifth or more of an average length of the etching pit.

2. The solid electrolytic capacitor according to claim 1, wherein the carbon coating layer has the carbon particles with a particle size that is impossible to enter the etching pit.

3. The solid electrolytic capacitor according to claim 2, wherein the carbon particles in the carbon coating layer is composed of the same type of carbon.

4. The solid electrolytic capacitor according to claim 3, wherein an interface resistance at the cathode is 10 mΩcm$^2$ or less.

5. The solid electrolytic capacitor according to claim 2, wherein the carbon particles with a particle size that is impossible to enter the etching pit in the carbon coating layer is composed of scale graphite.

6. The solid electrolytic capacitor according to claim 5, wherein an interface resistance at the cathode is 10 mΩcm$^2$ or less.

7. The solid electrolytic capacitor according to claim 2, wherein an interface resistance at the cathode is 10 mΩcm$^2$ or less.

8. The solid electrolytic capacitor according to claim 1, wherein the carbon particles in the carbon coating layer is composed of the same type of carbon.

9. The solid electrolytic capacitor according to claim 8, wherein an interface resistance at the cathode is 10 mΩcm$^2$ or less.

10. The solid electrolytic capacitor according to claim 1, wherein an interface resistance at the cathode is 10 mΩcm$^2$ or less.

11. A method for manufacturing a solid electrolytic capacitor comprising:
 a cathode formation process having a coating step of applying a carbon slurry having carbon particles to a surface of an oxide layer composed of an oxide of a valve metal on a surface of a cathode substrate composed of the valve metal and having an etching pit and drying the carbon slurry to form a slurry layer, and a pressing step of pressing the slurry layer to push the carbon particles into the etching pit and make the carbon particles penetrate through the oxide layer to form a carbon coating layer having an entry area entering the etching pit and a penetration area penetrating through the oxide layer and conducting with the cathode substrate;
 an anode formation process of forming a dielectric layer by oxidizing a surface of an anode substrate composed of a valve metal; and
 an electrolyte formation process of forming a solid electrolyte layer having a conductive polymer between the carbon coating layer of the cathode and the dielectric layer of the anode, wherein the pressing step in the cathode formation process is earned out until the entry area of the carbon coating layer has an average length of one fifth or more of an average length of the etching pit.

12. The method for manufacturing a solid electrolytic capacitor according to claim 11, wherein the carbon slurry has the carbon particles with a particle size that is impossible to enter the etching pit.

* * * * *